(12) United States Patent
Mermoz

(10) Patent No.: US 7,192,213 B2
(45) Date of Patent: Mar. 20, 2007

(54) COUPLING FLANGE SYSTEM FOR HOLLOW SHAFT

(75) Inventor: Emmanuel Mermoz, Senas (FR)

(73) Assignee: Eurocopter, Marignane cedex (FR)

( * ) Notice: Subject to any disclaimer, the term of this patent is extended or adjusted under 35 U.S.C. 154(b) by 119 days.

(21) Appl. No.: 10/790,089

(22) Filed: Mar. 2, 2004

(65) Prior Publication Data

US 2004/0190976 A1    Sep. 30, 2004

(30) Foreign Application Priority Data

Mar. 13, 2003  (FR) .................................. 03 03102

(51) Int. Cl.
*B60B 27/00*    (2006.01)
(52) U.S. Cl. ........................ 403/1; 403/370; 403/371
(58) Field of Classification Search ................ 403/377, 403/374.1, 374.2, 368, 367, 371, 370, 192, 403/194, 195, 199, 262
See application file for complete search history.

(56) References Cited

U.S. PATENT DOCUMENTS

| 3,250,089 | A |   | 5/1966  | Bruyere |
|---|---|---|---|---|
| 3,576,336 | A |   | 4/1971  | Uhlig et al. |
| 3,776,651 | A |   | 12/1973 | Peter et al. |
| 5,474,403 | A | * | 12/1995 | Hetrich ........................ 403/369 |
| 5,810,504 | A | * | 9/1998  | Rabinovich .................. 403/371 |
| 5,927,892 | A | * | 7/1999  | Teh-Tsung ................... 403/259 |
| 6,783,342 | B2 | * | 8/2004 | Norman et al. ........... 418/206.1 |

\* cited by examiner

*Primary Examiner*—Daniel P. Stodola
*Assistant Examiner*—Nahid Amiri
(74) *Attorney, Agent, or Firm*—Young & Thompson

(57) ABSTRACT

The system is of a type including a flange (5) and a set of conical internal rings (9) and external rings (8) combined to link by friction the flange to the shaft through the relative axial movement of the rings. Advantageously, the flange includes a rigid housing (7) with a cylindrical axial passage (7A) to receive coaxially the set of conical rings (8,9) and define between the inner surface of the passage (7A) and the outer surface of the external ring (8) an annular space (10) in which can be engaged the end (2A) of the shaft and of which the external ring (8) is elastically and radially deformable.

10 Claims, 4 Drawing Sheets

COUPLING FLANGE SYSTEM FOR HOLLOW SHAFT

BACKGROUND OF THE INVENTION

This invention concerns a coupling flange system providing interconnection between hollow or similar transmission shafts connecting together two power devices or machines, respectively the motor and the receiver, distant from one another.

A typical case is power transmission in a rotary wing aircraft like a helicopter, connecting the main rotor transmission box to the anti-torque tail rotor transmission box. Because of the distance between the two boxes (several meters), transmission comprises several aligned shafts supported by bearings along the transmission line and coupled together, and with the respective drive and receiver shaft. To do this, the ends facing the two shafts, extending one another, are equipped with flanges which, by a link connecting them together, form a coupling or coupling sleeve as such, which link between the flanges in this example is elastic and, more particularly to compensate for the slight deformations and aligning defects that may appear.

Naturally the invention is not confined to this particular application to the power transmission of a helicopter and could be used in other technical areas, as long as power or torque has to be transmitted by rotation between two devices, respectively the driving and receiving devices.

Generally, each flange of a coupling is fitted around the outer surface of the tubular end of a hollow shaft either by bonding and riveting or bolting, or by welding.

Although widely used, these two solutions nevertheless have drawbacks that cannot be left out of consideration.

In the first case, the weak spot is at the holes for riveting or bolting arranged radially at the shaft end, leading to local over-stressing that is always detrimental, in particular for the dynamic forces encountered on a helicopter (change of power level related to tail rotor maneuvering).

In the second case, welding causes a drop in the fatigue strength of the materials because of the annealing of the welding parts, making it necessary to allow for extra-thickness in the welding zone.

Furthermore, once attached to the ends of the shafts, the flanges cannot be removed (weld) or are almost irremovable (bonding and riveting-bolting) so that whenever a problem occurs, by exercise in a bearing (previously mounted on the shaft before the attachment of the flanges), a balancing device or even at a flange, the complete assembly concerned, the "shaft-end flanges-bearings" needs to be replaced by disassembly of the corresponding coupling flanges and replaced by a new assembly. Naturally, this results in high maintenance costs and the lasting immobilization of the helicopter.

In addition, to associate more generally a shaft and a hub or two shafts with one another, in a known embodiment, a friction link is used, for instance a set of two nested rings having combined external and internal conical surfaces. For instance, U.S. Pat. No. 5,067,847 describes such an embodiment in which the conical assembly is mounted between a solid shaft and a hub of a part. The inner conical ring works with the solid shaft and the outer ring with the hub so that the relative end movement of the internal ring on the shaft, by a controllable device, pulls on the outer ring which is opened radially by the joint operation of the combined conical surfaces and is applied against the inner surface of the part. In this way, couple can be transmitted between the shaft and the part through the conical assembly which, to do this, uses the principle of conical force-fitting.

However, this solution has the drawback of only being applicable to massive parts such as solid shafts and large hubs.

Another known embodiment described by French patent FR-2405 386 consists in using a cone working on wedges applying to a tubular part while also being integral with another tubular part. This solution is suitable for transmitting relatively low torque between two parts, but certainly not for transmitting high torque, as required for the tail rotor of a helicopter.

SUMMARY OF THE INVENTION

This invention aims to remedy these drawbacks and refers to a coupling flange system, the design of which allows the flange to be assembled and disassembled without affecting the integrity of the shaft, and to the transmission of high torque values.

To do this, the coupling flange system including a flange to be mounted on one end of a hollow or similar shaft, and a set of conical internal and external rings combined together to link said flange with said shaft by friction, following the relative axial movement of said rings, is outstanding according to the invention in that said flange includes a rigid housing with a cylindrical axial passage to accommodate, coaxially, said set of conical rings and to define between the inner surface of said passage and the outer surface of said external ring, an annular space in which said shaft end can be engaged and in that said external ring is elastically deformable radially in order to clamp by pinching on said shaft end in said annual space during the axial movement of the rings.

Accordingly, the link between the hollow shaft tubular end flange, advantageously of the pinching type, is carried out around the outer and inner surfaces concerned in the tubular end, sandwiched between the rigid housing and the set of conical rings, contrary to prior embodiments in which the action was by one of the shaft or tubular part surfaces only. This arrangement of the clamping system means that forces can be transmitted by friction into the respective contact surfaces and that the tubular end flange system can be disassembled easily for maintenance operations, by simply releasing said combined conical rings and canceling the pinching action between the flange body and the conical assembly.

In a preferred embodiment, the flange system also includes a rotating link between said housing and said internal ring. Accordingly, the couple introduced in the flange system is transmitted by friction without sliding in the form of a tangential force on the one hand, on the outer surface of the shaft by the rotation link between the housing and also on the inner surface of the shaft by a rotation link between the housing and the inner ring and the link between the inner ring and the outer ring combined. Therefore, high torque can be transmitted over a short length of the flange because the inside and outside surface of the hollow shaft are both under solicitation, also minimizing the weight of the flange system.

In an initial embodiment example, said rotation link comprises teeth working together, arranged respectively on the outer perimeter of said internal ring and on the inner perimeter of the internal passage in said housing.

According to a second embodiment example, said rotation link comprises a fitted plate secured to the transverse surfaces of said internal ring and said housing, opposing said shaft. Whatever the method used, the outstanding simplicity of the link design is evident.

Preferably, to obtain the radial elastic deformation of the external conical ring without causing any umbalance during a rotation, semi-through lateral slots spread out regularly with respect to one another are arranged in said conical ring. Advantageously, said semi-through lateral slots terminate alternatively in one and the other of the transversal faces of said external ring.

Further, said annular space is blind and extends more or less over the entire length of said external ring. Accordingly, the pinching end of the shaft is maximized.

In particular, this external conical ring has an external annular shoulder forming the bottom of said annular space, and against which the transversal face of the tubular end of said shaft abuts. Said axial housing passage also terminates in an internal annular shoulder against which said external conical ring applies.

According to the invention, said combined conical internal and external surfaces, respectively on external ring and internal ring, are cone-shaped with the apex on the end opposite said shaft.

To obtain clamping by pinching the tubular end of the shaft, said internal ring extends on the side opposite to said shaft by a threaded cylindrical part opening out from said axial passage in the housing, and the flange system then includes a clamping device screwed onto the threading of said internal ring, applying to said housing to pull said internal ring and cause the external ring to spread.

Advantageously, the inner surface of said internal ring flares linearly through to its transversal face turned toward said shaft so that the transversal section of said internal ring decreases gradually.

BRIEF DESCRIPTION OF THE DRAWINGS

The figures in the attached drawing clearly indicate how the invention can be obtained. In these figures, identical references designate similar elements.

DESCRIPTION OF THE PREFERRED EMBODIMENTS

Figure 1:
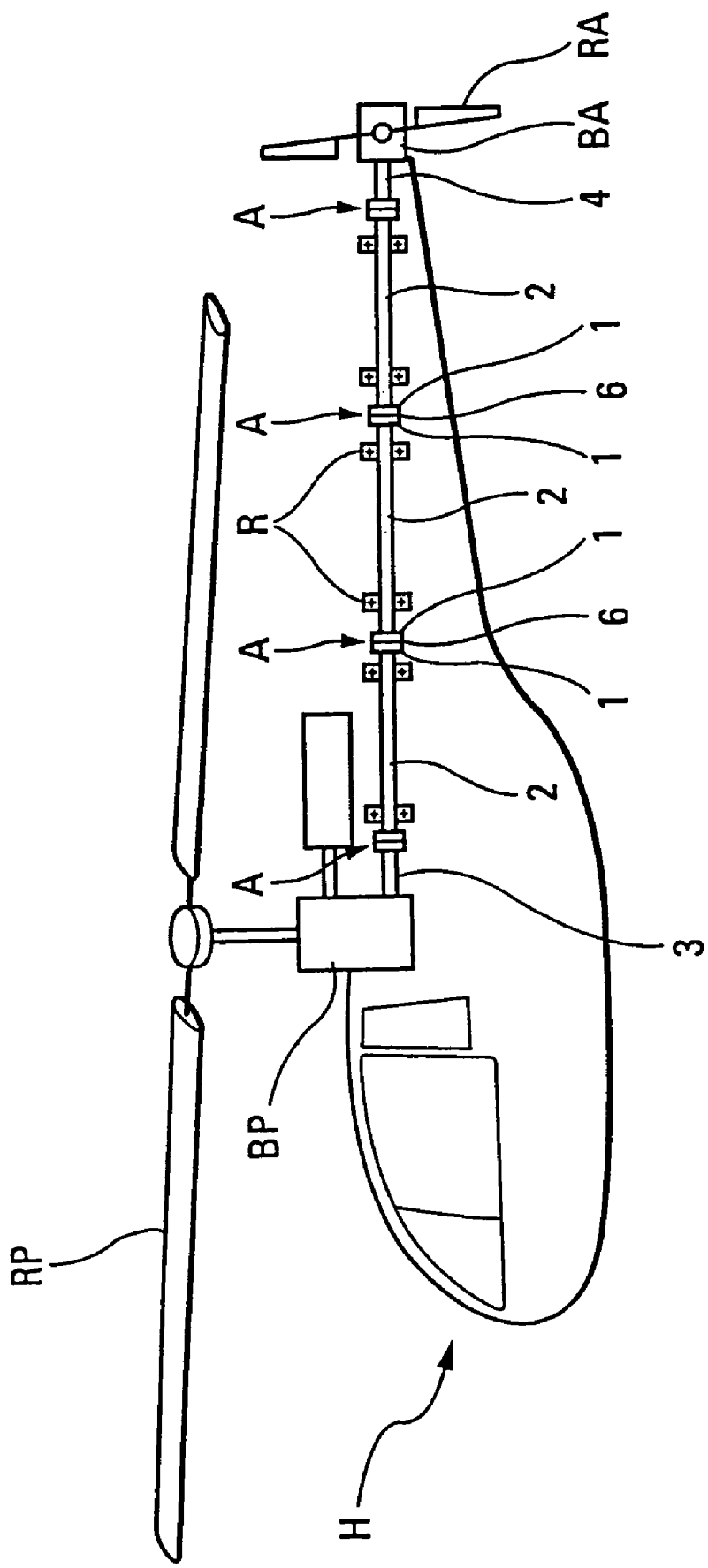
FIG. 1 represents schematically the hollow shaft transmission connecting the main rotor to the tail rotor of a helicopter provided with coupling flange systems complying with the invention.

In a preferential application, although it is not exclusive, represented schematically in FIG. 1, the flange systems 1 according to the invention are mounted at the respective facing ends of hollow shaft (as referred to as a tube) 2 forming the power transmission line connecting output shaft 3 of the transmission box BP of main rotor RP to input shaft 4 of transmission box BA of the tail rotor RA of a helicopter H.

This line comprises several hollow shafts or aligned tubes 2, supported by bearings R and connected by fixed elastic couplings A (often referred to as elastic sleeves) for the reasons mentioned previously (alignment, deformation, length). In this example, each coupling A has two flange systems 1 attached at the ends to face two consecutive shafts, respectively 3-2, 2-2, 2-4 and an elastic link 6 of the "Flector" disk type associating the two systems 1.

According to the invention, the link between each hollow shaft end flange system is by pinching, i.e. by grasping the outside and inside surfaces of the shaft end with couple transmitted to shaft 2 by the link between flange 5 and outer surface 2D of the shaft 2.

Figure 2:
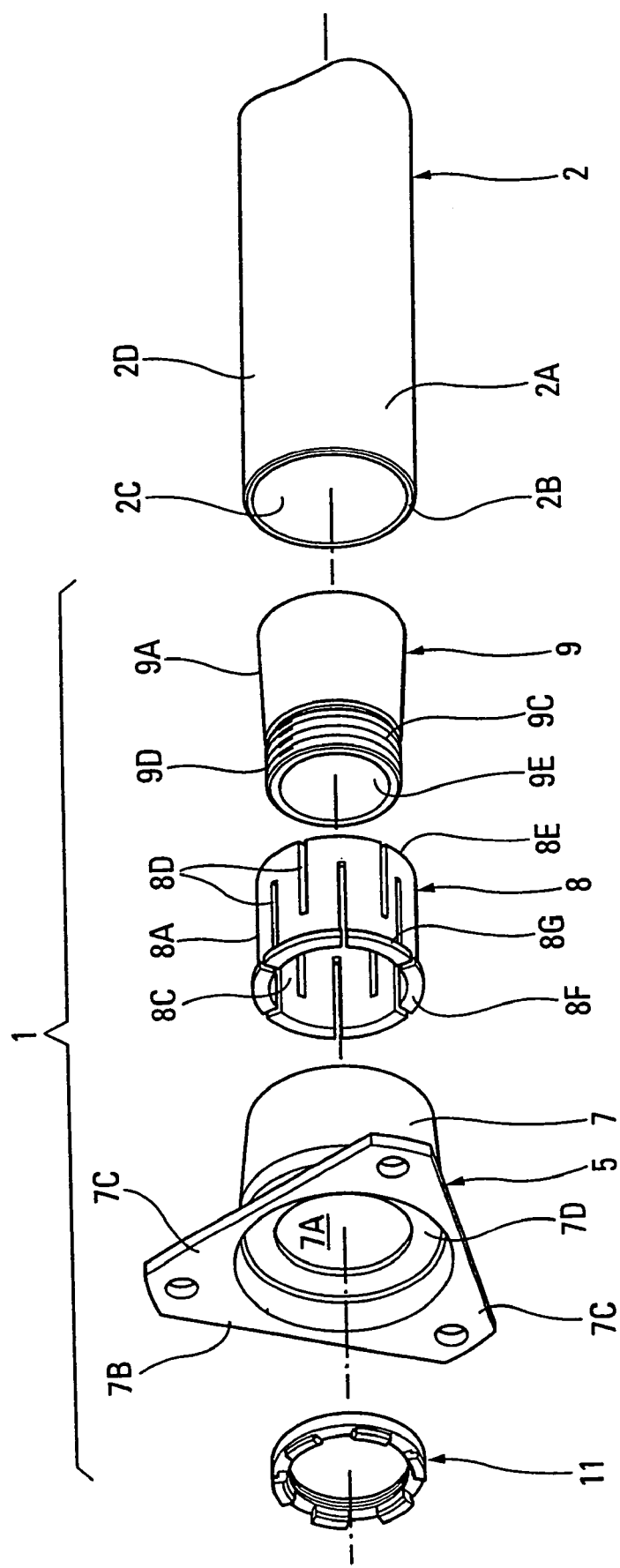
FIG. 2 is an exploded perspective view of an initial embodiment of the flange system according to the invention, showing its various components.
Figure 3:
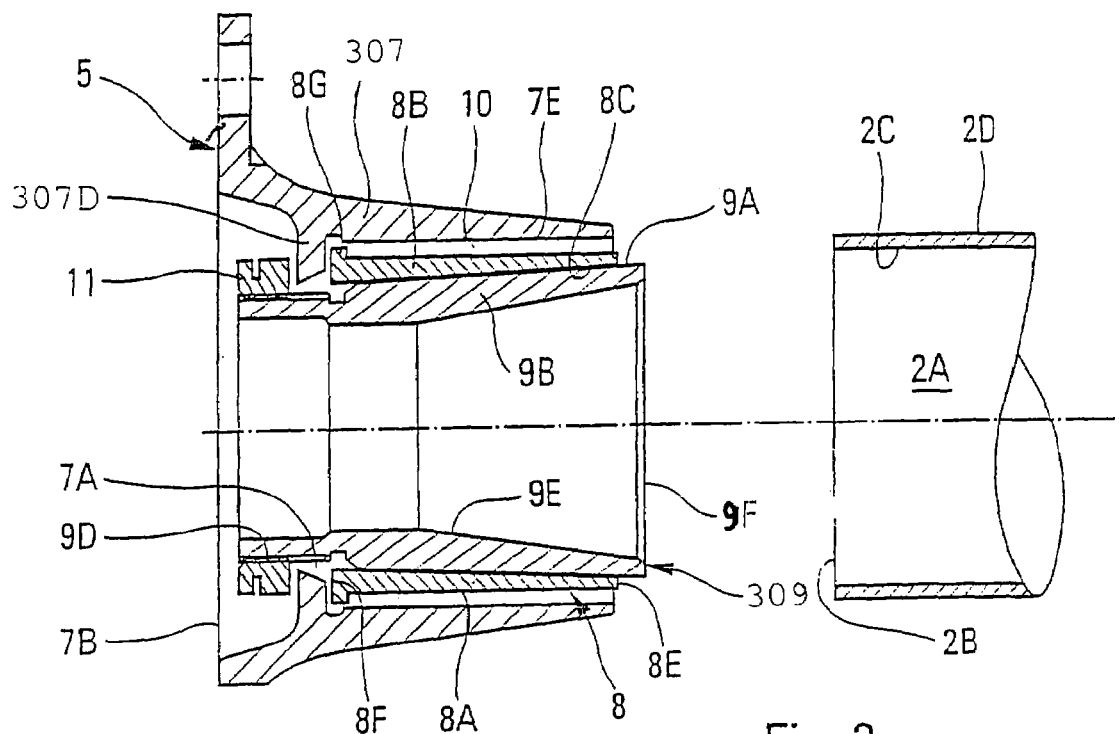
FIG. 3 is a longitudinal section of said assembled flange system, but before the assembly of the tubular end on a shaft.

To obtain this, as shown in perspective in FIG. 2, flange system 1, in this embodiment method, includes a flange 5 having a rigid housing 7 with a cylindrical axial passage 7A, a set of combined external 8 and internal conical rings 9 apt to be received in the axial passage of the housing and with it, forming an annular space 10 as shown in FIG. 3 for engaging the tubular end 2A of shaft 2, and a clamping device 11 such as a nut for clamping the components of flange system 1 and pinching the tubular end 2A of the shaft in annular space 10 by the movement of external and internal conical rings 8 and 9, as will be seen subsequently.

Figure 4:
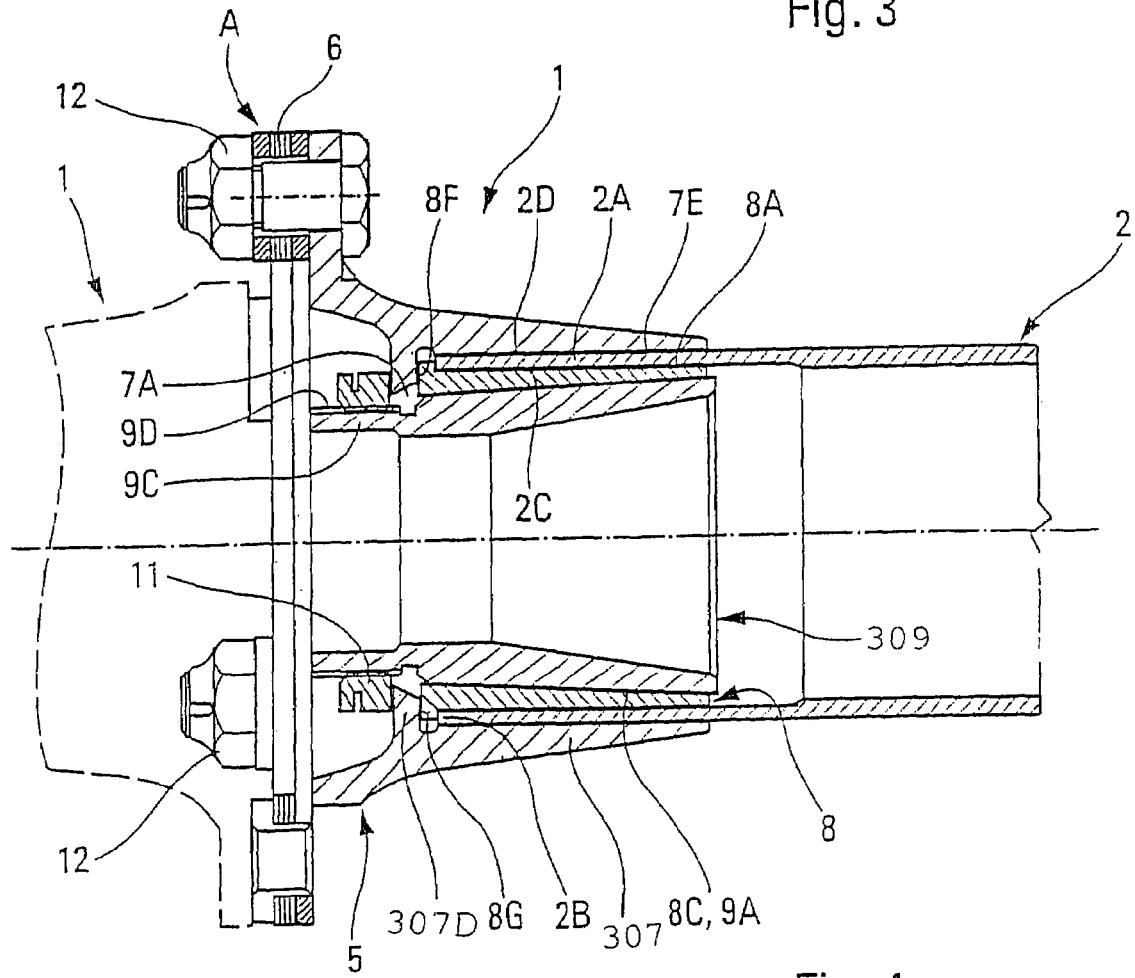
FIG. 4 is a longitudinal sectional view of said flange system after the assembly of said tubular shaft end.

Structurally, it can be seen in FIGS. 2 to 4 that the rigid housing 7 of flange 5, on the side opposite the reception end of the hollow shaft, a transversal triangular base 7B forming more or less three radial arms 7C set out at 120° with respect to one another and attached to the corresponding outer disk of the elastic link 6 of coupling A by respective bolts 12 (FIG. 4). The three radial arms of the opposite flange system base, shown in dotted lines in FIG. 4, are attached by bolts to the other external disk of elastic link 6, thus terminating coupling A as such between the two shafts to be connected. It is also evident in FIG. 3 that the axial passage 7A terminates in an internal annular shoulder 7D against which is pressed the set of external and internal conical rings 8 and 9. Dimensionally, the cylindrical surface 7E of axial passage 7A has a diameter very slightly greater than the outside diameter of tubular shaft 2.

As far as external conical ring 8 of said assembly is concerned, the outer surface 8A of its side wall 8B has an inside diameter very slightly smaller than the inside diameter of the end of said shaft which can thus engage, with some adjustment, in annular space 10 formed between inner cylindrical surface 7E of the axial passage of housing 7 and the outer surface 8A of the external ring. The inside surface 8C of its wall has a truncated shape with a very small opening cone, the apex of which is on the opposite side to the hollow shaft to be clamped.

Furthermore, its side wall 8B, advantageously, is elastically deformable radially. To obtain this, as shown in particular in FIG. 2, it has semi-through side slots 8D which are set out at equal angles with respect to one another and the other slots around its annular wall. For instance, there are twelve of them, six slots through on transversal side 8E turned toward shaft 2 and six others alternating with the previous ones, opening through on the side of the other transversal face 8F. Slots 8D extend approximately over two-thirds of the ring length.

Finally, the other transversal side 8F of external conical ring 8 terminates in an external annular shoulder 8G which, on one side, is designed to press against internal annular shoulder 7D of flange housing 5 and, on the other, forms a bottom for annual space 10 against which transversal face 2B of tubular end 2A of the hollow shaft is designed to abut.

As concerns internal conical ring 9, outer surface 9A of its side wall 9B is truncated with equal but inverse conicity to that of external conical ring 8 so that internal surfaces 8C and external surfaces 9A respectively of external conical ring 8 and internal conical ring 9 are combined. Note also that internal conical ring 9 extends on the side turned toward the outside in a cylindrical part 9C emerging from said internal annular shoulder 7D of flange 5 and has threading 9D for the assembly of clamping device 11. In addition, inner surface 9E of the ring is more or less cylindrical, but flares towards its transversal end face 9F turned toward the shaft, so that the transversal section of wall 9B decreases gradually.

The assembly of flange system 1 to tubular end 2A of shaft 2 is particularly simple and obtained as follows.

First, as shown in FIG. 3, the components forming the coupling flange system 1, i.e. flange 5 with rigid housing 307 (corresponding to FIG. 2 housing 7), the set of truncated external and internal conical rings 8, 309 (corresponding to FIG. 2, rings 8, 9) and clamping device 11 are first assembled, without any force being caused due to the clamping of the nut, which could result in the radial spreading of external conical ring 8. Therefore, it is mounted loose and may slide, although in a limited way, on internal conical ring 309.

Tubular end 2A of hollow shaft 2 is then inserted into annular space 10 of flange 5 until its transversal face 2B comes into contact with external annular shoulder 8G of external ring, which shoulder 8G is itself in contact with internal annular shoulder 307D (corresponding to shoulder 7D of FIG. 2). End 2A of the shaft, thus abutting axially, fits appropriately into the annular space.

The axial immobilization of shaft 2 with respect to the flange system is obtained, and clamping device 11, mounted on threading 9D of internal conical ring 309, is then screwed in until it comes into contact with internal annular shoulder 307D, as shown in FIG. 4. This causes a slight axial movement, by the sliding of the truncated internal conical ring 309 to the outside, i.e. towards the left in FIG. 4 (extraction movement), whereas external ring 8 is axially abutted against internal annular shoulder 307D. Simultaneously with screwing in, by the combination of the effect of external truncated surface 9A and internal truncated surface 8C of respective internal and external conical rings 309 and 8, the expansion or limited radial deformation of split wall 8B of external conical ring 8 is produced, through slots 8D, so that the outside cylindrical surface 8A is applied hard against the inside cylindrical surface 2C of tubular shaft end 2A. This radial expansion of lateral wall 8B of the external ring reduces the annular space 10 and, by counter-reaction, causes contact between the outer cylindrical surface 2D of shaft tubular end 2 with the inner cylindrical surface 7E of the axial passage with which the housing is advantageously rigid.

Accordingly, tubular end 2A of the shaft is clamped by pinching between the housing of flange 5 and truncated assembly of external and internal conical rings 8, 9 by clamping device 11. Flange system 1 then transmits its forces by friction onto the contacting surfaces.

Also shown, as indicated previously, is elastic disk 6 of coupling A attached by bolts 12 to base 7B of housing 307 and, in dotted lines and partially, the other flange system 1 of the coupling mounted on the tubular end of another shaft forming an extension to illustrated shaft 2.

Naturally, the radial deformation of the shaft tubular end under the applied clamping force remains less than the elastic limit of the component material. Also, local pressures caused in the various components are also less than the peening limits of the materials concerned.

Figure 5:
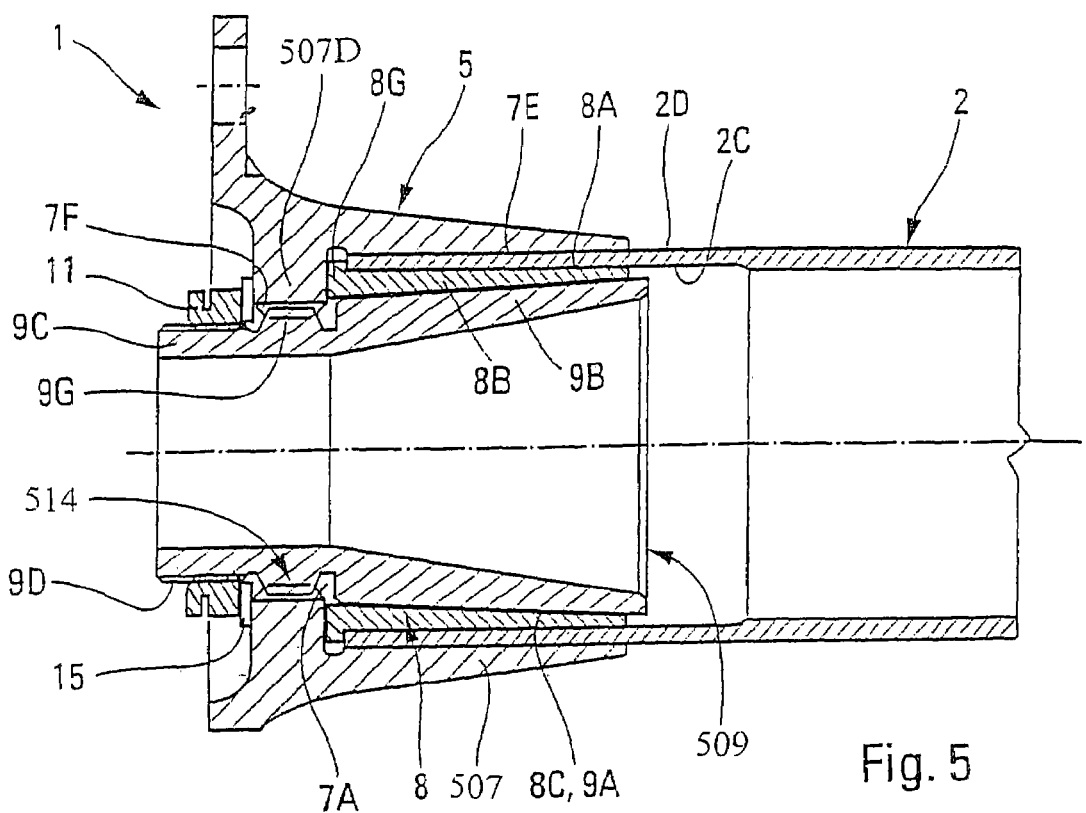
FIGS. 5 and 6 are longitudinal sectional views respectively of two other embodiments of the flange system.
Figure 6:
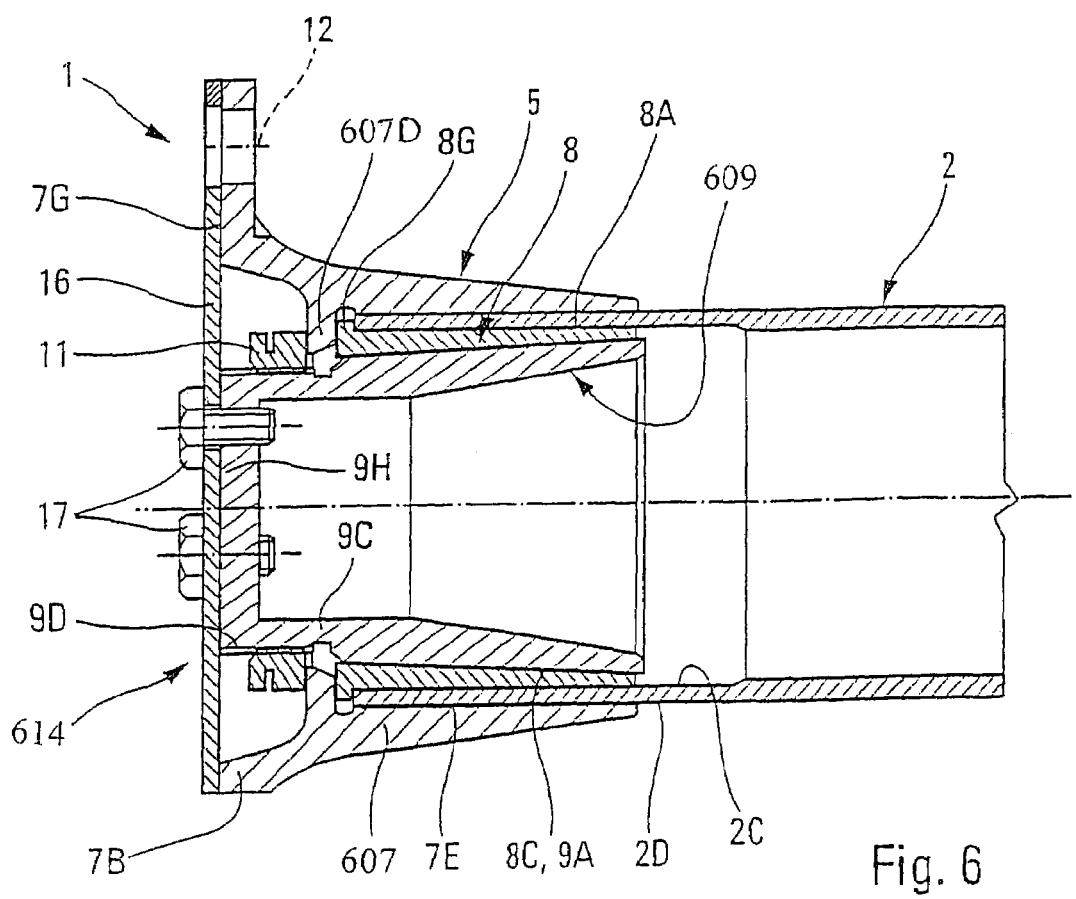

In two other embodiments shown in FIGS. 5 and 6, a rotational link 514,614 is generated between rigid housing 507, 607 (corresponding to FIG. 2 housing 7) of flange 5 and truncated internal conical ring 509, 609 (corresponding to FIG. 2 ring 9) of the assembly, so that considerable couple can be transmitted efficiently, not only through the outer surface of the shaft but also through the inner surface, by means of the conical assembly.

In these two embodiments, the flange system structure, i.e. flange 5 with housing 507, 607, the set of external and internal conical rings, the annular space 10 and the clamping device 11, as well as its assembly and mounting on the tubular end of shaft 2, are identical to the first embodiment described above and will not be explained in any greater detail.

In the second embodiment illustrated in FIG. 5, the rotating link 514 is of the obstacle-drive type and comprises a multitude of teeth 7F (or ribbing) arranged on the inner perimeter of internal annular shoulder 507D of rigid housing 507 and a multitude of complementary teeth 9G on the outside of the inner ring, corresponding with said internal annular shoulder 507D between threading 9D and the truncated wall 9B of internal conical ring 509. The rotating link, through two teeth 7F–9G, radially connecting housing 507 of flange 5 to internal conical ring 509 of the assembly, allows considerable torque to be passed to shaft 2 by the inner ring, the combined truncated surfaces and the outer ring. A washer 15 is also provided between clamping device 11 and link 514 to ensure a sufficient bearing capacity of clamping device 11 on internal annular shoulder 507D.

In the third embodiment shown in FIG. 6, the rotary link 614 is of the friction drive type comprising a plate 16 attached to housing 607 and internal conical ring 609. More particularly, plate 16 is applied to the transversal face 7G of base 7B and the transversal face 9H of internal conical ring 609, while the two transversal faces 7G and 9H are contained more or less within the same plane, perpendicular to the axis of flange system 1. An adjusting shim, not shown, could be introduced advantageously between plate 16 and faces 7G or 9H respectively of housing 7 and the internal conical ring to ensure the assembly of the components 16, 7 and 609, without any play or spurious flexing forces. It is also evident that the transversal face of internal conical ring 609 is solid so as to be able to attach plate 16 to it with screws 17, whereas attachment of the plate to base 7B is by means of bolts 12, not shown, in coupling A. Therefore, plate 16 is arranged between the elastic disk 6 of coupling A and base 7B of flange 1 housing 607.

Here again, link 614 allows couple to be passed by friction between the flange 1 and shaft 2 system by flange 5 and the set of truncated external and internal conical rings.

For the application to the transmission line of a helicopter, these two tangential link embodiments are preferred.

Also note the ease with which flange system 1 according to the invention can be disassembled. After disassembly of bolts 12 associating the two coupling systems A, the clamping nut concerned is unscrewed to ensure axial mobility of the assembly of external and internal conical rings, canceling the pinching action on the tubular end of the shaft so that the flange system can be withdrawn. As far as the third embodiment is concerned, the screws retaining the plate are first removed so as to allow its removal and give access to the clamping device.

It is then easy to work on the bearings, the balancing devices and vibration absorbers, etc. provided along the shaft for replacement, servicing, checking, etc., thus considerably reducing costs and maintenance times on the transmission, without deteriorating the transmission shafts, and for reassembly or change of each of the flange systems if necessary.

The invention claimed is:

1. A system of coupling flanges, comprising:
   an internal conical ring;
   an external conical ring;
   semi-through side slots spread out regularly with respect to one another inside said external conical ring; and
   a flange having a rigid housing with a cylindrical axial passage coaxially accommodating said internal conical ring and said external conical ring,
   said internal and external conical rings cooperating through relative axial movement to link by friction said flange with a hollow shaft, and to define an annular space between an inside surface of said cylindrical axial passage and an outer surface of said external conical ring,
   said annular space making it possible to engage an end of said hollow shaft,
   said external conical ring being elastically deformable radially so as to clamp by pinching said end of said hollow shaft in said annular space during an end-wise movement of said internal conical ring and said external conical ring,
   wherein, said external conical ring has an annular external shoulder forming at a bottom of said annular space and against which is applied to abut a transversal face of said end of said shaft.

2. A system according to claim 1, wherein, the semi-through side slots terminate alternatively in a first end and a second end of transversal faces of said external conical ring.

3. A system according to claim 2, further comprising a rotating link between said rigid housing and said internal conical ring.

4. A system according to claim 1, characterized in that it also includes a rotating link between said rigid housing and said internal conical ring.

5. A system according to claim 1, wherein, an inner surface of said internal conical ring flares linearly through to its transversal face turned towards said shaft so that a transversal section of said internal conical ring decreases gradually.

6. A system according to claim 1, wherein, said annular space is closed on one end and open on another end, and extends over the entire length of said external conical ring.

7. A system according to claim 1, wherein, an inside conical surface and an outside conical surface, respectively of said external conical ring and said internal conical ring are cone-shaped with an apex on the opposite end to said shaft.

8. A system according to claim 1, wherein, said cylindrical axial passage of said housing terminates by an internal annular shoulder against which said external annular ring bears.

9. A system of coupling flanges, comprising:
   an internal conical ring;
   an external conical ring;
   semi-through side slots spread out regularly with respect to one another inside said external conical ring;
   a flange having a rigid housing with a cylindrical axial passage coaxially accommodating said internal conical ring and said external conical ring,
   said internal and external conical rings cooperating through relative axial movement to link by friction said flange with a hollow shaft, and to define an annular space between an inside surface of said cylindrical axial passage and an outer surface of said external conical ring,
   said annular space making it possible to engage an end of said hollow shaft,
   said external conical ring being elastically deformable radially so as to clamp by pinching said end of said hollow shaft in said annular space during an end-wise movement of said internal conical ring and said external conical ring; and
   a rotating link between said rigid housing and said internal conical ring,
   wherein, said rotating link is made of cooperating teeth arranged respectively on an outer perimeter of said internal conical ring and on an inner perimeter of said cylindrical axial passage of said rigid housing.

10. A system of coupling flanges, comprising:
    an internal conical ring;
    an external conical ring;
    semi-through side slots spread out regularly with respect to one another inside said external conical ring; and
    a flange having a rigid housing with a cylindrical axial passage coaxially accommodating said internal conical ring and said external conical ring,
    said internal and external conical rings cooperating through relative axial movement to link by friction said flange with a hollow shaft, and to define an annular space between an inside surface of said cylindrical axial passage and an outer surface of said external conical ring,
    said annular space making it possible to engage an end of said hollow shaft,
    said external conical ring being elastically deformable radially so as to clamp by pinching said end of said hollow shaft in said annular space during an end-wise movement of said internal conical ring and said external conical ring,
    wherein, said internal conical ring extends on the end opposite to said shaft in a threaded cylindrical part opening from said cylindrical axial passage of said rigid housing and includes a clamping device screwed onto said threaded cylindrical part and is applied against said rigid housing to pull said internal conical ring and cause a spreading apart of said external conical ring.

* * * * *